March 21, 1961 G. WANINGER 2,975,807
SUPPLY CONVEYING MEANS
Filed Sept. 30, 1954 2 Sheets-Sheet 1
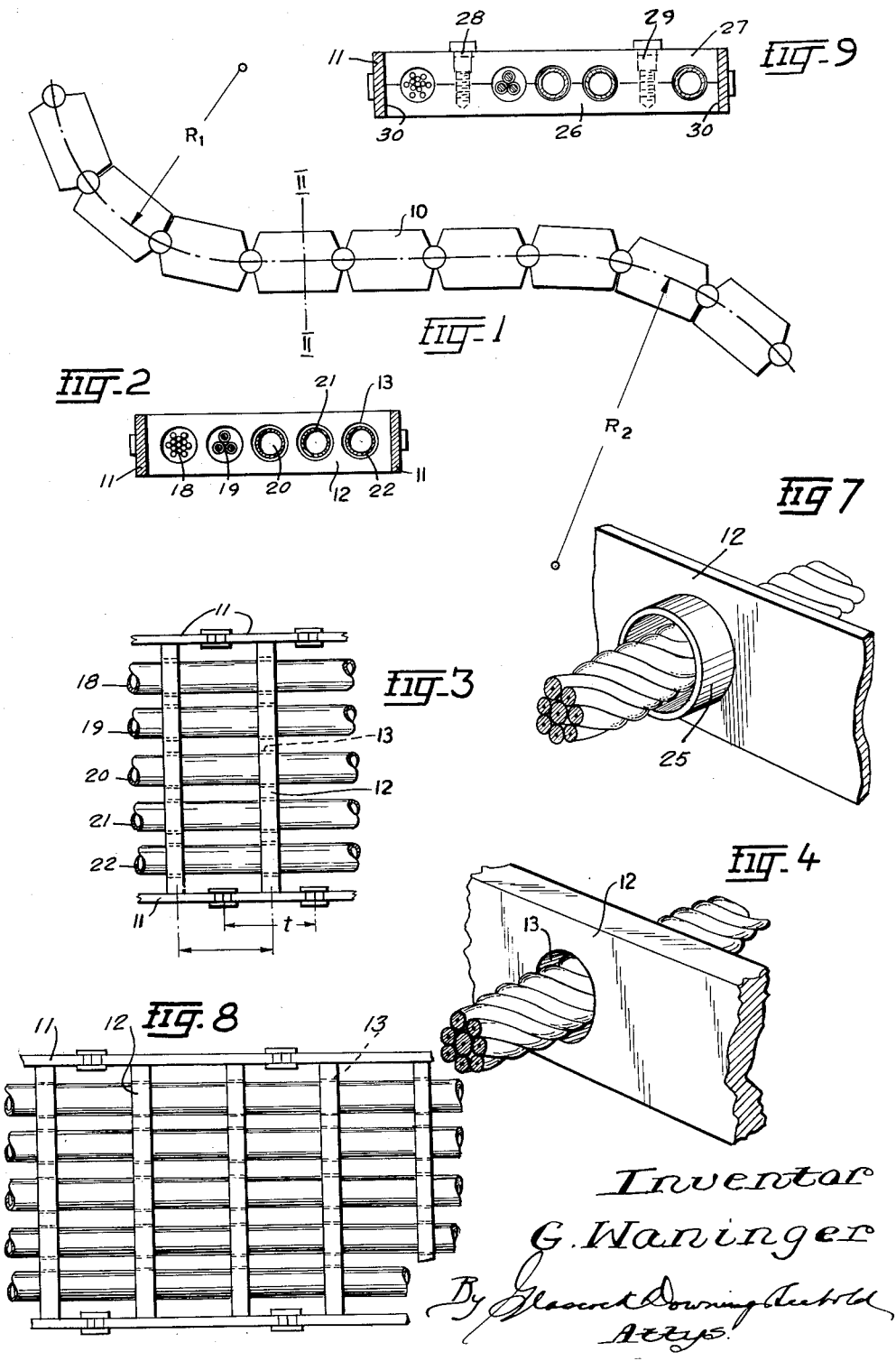
Inventor
G. Waninger

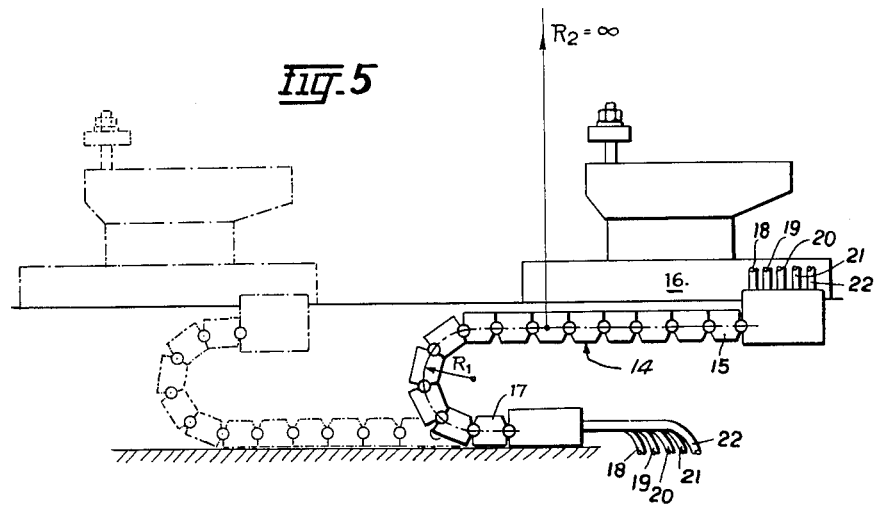
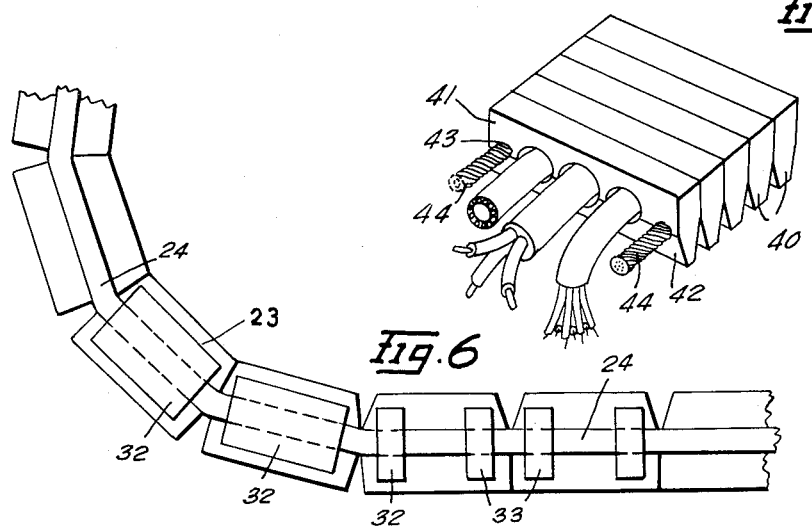
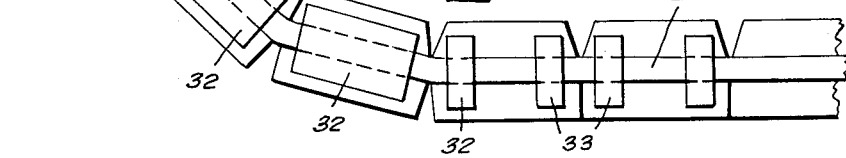
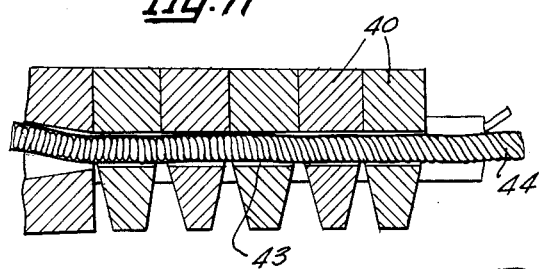

United States Patent Office 2,975,807
Patented Mar. 21, 1961

2,975,807

SUPPLY CONVEYING MEANS

Gilbert Waninger, Victoria-Allee 19, Aachen, Germany

Filed Sept. 30, 1954, Ser. No. 459,301

Claims priority, application Germany Oct. 29, 1953

7 Claims. (Cl. 138—61)

This invention relates to arrangements for the conveyance of supplies of all kinds through conductors (by which term is meant not only electrical conductors but also tubes or the like for the conveyance of fluids) to parts moving on guides or tracks.

In the construction of machine tools the problem often arises of conveying to a movable slide, for example the carriage of a large lathe, of supplies through closed conductors as for example electrical energy, liquids (oil, water) compressed air or the like for the actuation of devices necessary for the operation of the slide or of devices carried with the slide, for example clamping devices, hydraulic appliances, electric auxiliary apparatus. Similar problems arise in numerous other technological fields.

For electrical supplies conductors co-operating with brushes, and cables are known. In the case of conductors co-operating with brushes, however, only a relatively small number of conductors can be used because the space requirements of such arrangements are very great. Also, to avoid the brushes slipping off the conductors it is essential that the conductors should be arranged accurately parallel to the slideway which makes the installation difficult. Deposits of cast iron, carbon or brass dust and moisture in the air can very easily lead to damage due to leakage currents or even to short circuits. Sliding contacts thus constitute a source of unreliability. To ensure reliable operation sliding contact arrangements need constant maintenance. Further, the exposed conductors need protection from contact with metal parts such as turnings, tools or loose appliances as well as by the machine itself, and thus can only be used to a limited extent without additional measures.

With supplies by means of cables, the difficulty lies in the relief of the cable from mechanical loads and the accommodation of the necessary free loop of cable for the movements of the slide. The permissible radius of bending of such trailing cables is limited so that damage to the conductors easily arises at the bends. Proposals have been made according to which the loop is guided by a roller having a minimum diameter adapted to the cable but though a cable thus guided has the severity of its radius of bending limited it is not relieved from tension. Relief from tension by the incorporation of a wire rope structure increases the crushing of the cable at the bends or on the roller. In addition, such cables are exposed to external mechanical damage because the covering of the cable is, in many cases, exposed to abrasion through sliding friction. Conditions similar to those applying to electric cables also apply to hose pipes for the supply of water, oil and compressed air. In particular, the mechanical stressing is even greater with hose pipes as relief from tension for example by means of wire cables can only be provided with great difficulty. The difficulties which arise in the use of hose pipes for liquids or air in conjunction with movable slides often lead therefore to the advantages of devices carried on such slides and actuated by liquids or compressed air being sacrificed. These different advantages of the prior proposals for the conveyance of supplies of all kinds through conductors to parts moving on guides or tracks are mitigated or overcome by the arrangement according to the invention. This comprises a chain having one or more internal passages extending through it for the accommodation of conductors externally protected by the chain, of which chain the links can only swing through a limited angle relative to one another, the value of which corresponds to the permissible radius of bending of the most sensitive conductor.

An example of embodiment of the invention is illustrated in the accompanying drawings.

Fig. 1 is a side view of a cable carrying chain according to the invention for use between the bed and carriage of a large lathe, Fig. 2 is a section on the line II—II, Fig. 3 is a plan view of part of the chain according to Fig. 1, Fig. 4 is a detail shown in perspective, Fig. 5 illustrates the use of the cable carrying chain according to the invention on the carriage of a large lathe, Fig. 6 shows another form of construction of cable carrying chain according to the invention in a side view.

Fig. 7 shows a fragmentary perspective view of a cross member differing somewhat from that of Fig. 4, Fig. 8 is a plan view similar to Fig. 3 in which two cross pieces are used in each link, Fig. 9 is a section similar to Fig. 2 showing a two part cross piece, and Figs. 10 and 11 show a perspective and a section, respectively, of a still further modification.

The chain which carries the flexible conduits, conductors and the like, such as indicated by numerals 18, 19, 20, 21, 22 discussed below, for delivery of services such as electric power, compressed air, water or other fluids to a part moving in a guided path according to Fig. 1 consists of chain links 10 which are connected together to form a carrying chain and are so shaped that the cable can only be bent in one direction to a minimum radius $R_1$, while in the other direction a radius of curvature $R_2$ is the minimum. According to the particular use in view these two radii can be the same or different, and indeed one of them can be infinite, i.e., the chain cannot be bent beyond the straight line on one side. As shown the angle between adjacent links is limited by the abutment of suitably bevelled end edges on the links but actual abutments or other abutment surfaces might be provided.

Fig. 2 shows how each link 10 may be formed of chain plates 11, one on each side of each of the links of the chain which are connected together by cross webs 12 to form the chain links 10. There might be more than two chain plates to each link, for example a third plate midway between the two plates shown. Openings in the form of bores 13 are made in the cross webs which when the chain is in its extended position are in alignment with one another, and in this way constitute a number of internal passages extending through the length of the chain, in which the conductors 18, 19, 20 etc. can be so carried that the difference in length between the conductors with the chain bent compared with the length of the through passages when the chain is straight is reduced to a minimum value, being in some cases completely eliminated and in others being compensated for by clearance between the conductors and the bores.

The number of cross webs and their thicknesses, i.e., the bearing surface for the conductors, can be adapted to the conditions of the particular case. To save weight it is possible to provide bearing members, for example short tubes or the like in the bores, so that in this way the cross webs can be made thinner than would of itself suffice to give the necessary bearing surface as seen in Fig. 7.

Fig. 3 shows each pair of corresponding chain plates connected together by but one cross web. Obviously it is possible to provide several cross webs to each pair of plates to form a single link therewith as seen in Fig. 8. In the example according to Fig. 3, the spacing of the cross webs is equal to the chain pitch $t$.

The use of the cable carrying chain as a cable carrier according to the invention enables single cables, for example loosely twisted single core cables, to be used as conductors of electricity as shown in Fig. 4 without deformation or untwisting of the cable being feared.

According to Fig. 5 the cable carrying chain 14 is secured at one end 15 to the carriage 16 of a large lathe, while the other end 17 is secured to the foundation or a terminal box standing on the foundation.

This chain is so constructed that the minimum radius of curvature $R_1$ is greater than the permissible minimum radius of the cables or hose pipe carried by the chain, while the radius $R_2$ is infinite, that is, in this direction the chain remains straight and cannot bow downwards so that the upper and lower ends can move freely without relative hindrance. The radius $R_2$ may conveniently be held to infinity by provision of square ends on the links or chain plates so that when the chain is straight these ends contact. In this chain 18 indicates an electric control cable, 19 a main current cable, 20 a hose pipe for compressed air, 21 a hose pipe for water, and 22 a hose pipe for oil.

Fig. 6 shows another constructional form in which the chain links 23 are connected one with another not in the known way by chain bolts but by a wire cable 24 secured on the sides of the plates. Means to secure the wire cables to the links are shown. Chain members 23 are mounted on a wire rope 24, the wire rope 24 being supported in parts 32 provided with lengthwise extending recesses. Rope 24 can also rest in parts 33.

Fig. 7 shows a cross member 12 with inserted tube piece 25 or the like which has a greater length than the width of member 12.

In Fig. 8 a chain is illustrated with which between each two sections belonging together two cross members 12 are arranged.

Fig. 9 shows a bipartite member, the lower part 26 of which is fixedly connected at 30 with sections 11 while the upper part 27 is joined firmly by screws 28, 29 with the lower part.

Figs. 10 and 11 represent a device which consists of apertured members 40. The bores 43 extend transversely of the lengthwise axis of these members and are intended to receive wire ropes 44. The members can be constructed unilaterally parallel as at 41 or as at 42 flattened at an acute angle. Thus, it is possible to arrange the cross webs so that they are located at the pivotal axes of the chain, in order that the conductors may be held at these points. Further, the conductors can be secured to the cross webs for example by clamping, or by shackles, and the webs can be sub-divided, one part being secured to the lateral plates while the other part is removably secured to the first part, for instance by screws, the dividing line passing through the openings so that the conductors can be laid in place before the second part of each web is secured; in this way the conductors are readily removable. The construction in which the chain plates are hinged together by means of cables instead of chain bolts can be modified, as seen in Figs. 10 and 11, in such a way that the plates are provided with longitudinal bores and are thrust or set on the cables or clamped thereto by clamps, plates or the like or secured in some other way. The lateral plates may then be no more than locking pieces which limit the bending of the cables. Indeed, suitably formed chain plates can be provided which are thrust over two cables, particularly strong in tension but adapted for example as electric cables so that these two cables on the sides of the chain themselves serve as cables for connecting the chain links. Further, the chain plates and webs of a link can be made in a single piece for example by bending iron or steel plate into U form, the web of the U constituting the cross web of the link and the two limbs the side plates of the chain, in which case it is again possible to let the connection between the plates of adjacent links be made by two of the cables themselves.

I claim:

1. A protective support for flexible conduits, conductors and the like for delivery of services such as electric power, compressed air, water and the like to a part moving in a guided path, comprising a chain made up of links hinged together at their contiguous ends, the line of said hinges being the neutral axis of said chain, each said link comprising at least two laterally spaced chain plates and at least one cross web uniting the lateral plates, each of said cross webs having transversely of the chain similar sets of openings therein, each opening of said similar sets of openings constituting with the corresponding openings of the other links a plurality of parallel passages longitudinally of said chain, each said passage being adapted to receive at least one flexible conductor longitudinally therethrough, the said chain plates having to one side of the neutral axis inclined end edges each of which serves with the adjacent edge of the contiguous plate to limit the angle of swing of the links of the chain relative to one another when bent to cause said edges to contact each other to a value corresponding with a predetermined radius of bending of the conductor most sensitive to bending, said chain plates having on the other side of the neutral axis end edges at right angles to the length of the chain which serve with the similar edges of the contiguous chain plates, when said edges are in contact with each other, to hold the chain straight.

2. The device of claim 1 comprising a bearing member for the flexible conductor at each opening in the webs, the bearing members being of greater length than the thickness of the webs.

3. The device of claim 1, wherein said openings are holes of sufficiently greater diameter than the conductors accommodated therein for the resulting clearance to compensate for the variations in length of the conductors compared with the length of the chain due to bending of the chain.

4. The device of claim 1, also provided with means on each link for restraining the conductors against longitudinal movement relative to the link.

5. The device according to claim 4 wherein said restraining means comprise clamps on the cross webs.

6. The device as set forth in claim 1 wherein said cross webs are each in two parts, a first part united to the lateral plates and a second part separately secured to said first part, the line of division between the parts passing through the openings for the flexible conductors.

7. Duct means for delivery of services such as electric power, compressed air, water and the like to a part moving in a guided path, comprising a chain made up of links hinged together at their contiguous ends, the line of said hinges being the neutral axis of said chain, each said link comprising at least two laterally spaced chain plates and at least one cross web uniting the lateral plates, each of said cross webs having transversely of the chain similar sets of openings therein, at least one flexible conductor in each longitudinal passage constituted by corresponding openings in the cross webs, the said chain plates having to one side of the neutral axis inclined end edges each of which serves with the adjacent edge of the contiguous plate to limit the angle of swing of the links of the chain relative to one another when bent to cause said edges to contact each other to a value corresponding wtih a predetermined radius of bending of the conductor most sensitive to bending, said chain plates having on the other side of the neutral axis end edges at right angles to the length of the chain which serve with the similar edges of the contiguous chain plates, when said edges are in contact with each other, to hold the chain straight.

References Cited in the file of this patent

UNITED STATES PATENTS

| | | |
|---|---|---|
| 1,677,077 | Fortune | July 10, 1928 |
| 1,778,040 | Rutherford | Oct. 14, 1930 |
| 2,177,128 | Johnson | Oct. 24, 1939 |
| 2,663,194 | Ogard | Dec. 22, 1953 |
| 2,668,557 | Hoelscher | Feb. 9, 1954 |
| 2,727,088 | La Wall | Dec. 13, 1955 |
| 2,748,803 | Guarnaschelli | June 5, 1956 |

FOREIGN PATENTS

| | | |
|---|---|---|
| 3,942 | Great Britain | Mar. 20, 1886 |
| 146,768 | Germany | Jan. 29, 1903 |
| 610,743 | Great Britain | Oct. 20, 1948 |
| 685,855 | Germany | Dec. 27, 1938 |
| 694,161 | Germany | July 26, 1940 |